(12) United States Patent
Tolentino et al.

(10) Patent No.: US 9,174,611 B2
(45) Date of Patent: Nov. 3, 2015

(54) WINDSHIELD WIPER ADAPTER, CONNECTOR AND ASSEMBLY

(75) Inventors: Vambi Raymundo Tolentino, Coconut Creek, FL (US); Robert Peter Peers, Boca Raton, FL (US)

(73) Assignee: Pylon Manufacturing Corp., Deerfield Beach, FL (US)

( * ) Notice: Subject to any disclaimer, the term of this patent is extended or adjusted under 35 U.S.C. 154(b) by 83 days.

(21) Appl. No.: 13/558,624

(22) Filed: Jul. 26, 2012

(65) Prior Publication Data

US 2013/0192015 A1    Aug. 1, 2013

Related U.S. Application Data

(60) Provisional application No. 61/512,492, filed on Jul. 28, 2011.

(51) Int. Cl.
  *B60S 1/38*    (2006.01)
  *B60S 1/40*    (2006.01)

(52) U.S. Cl.
  CPC .............. *B60S 1/4003* (2013.01); *B60S 1/3801* (2013.01); *B60S 1/4009* (2013.01); *B60S 1/3867* (2013.01); *B60S 1/4006* (2013.01); *B60S 2001/4012* (2013.01)

(58) Field of Classification Search
  CPC ......... B60S 2001/4012; B60S 1/4006–1/4019; B60S 1/3849–1/386
  USPC .............. 15/250.43, 250.361, 250.201, 15/250.44–250.48; 403/331, 361, 59, 60
  See application file for complete search history.

(56) References Cited

U.S. PATENT DOCUMENTS

| | | |
|---|---|---|
| D56,762 S | 12/1920 | Minier |
| 2,310,751 A | 2/1943 | Scinta |
| 2,550,094 A | 4/1951 | Smulski |
| 2,589,339 A | 3/1952 | Carson |
| 2,616,112 A | 11/1952 | Smulski |
| 2,643,411 A | 6/1953 | Nesson |
| 2,658,223 A | 11/1953 | Enochian |
| 2,799,887 A | 7/1957 | Nemic |
| 2,801,436 A | 8/1957 | Scinta |
| 2,814,820 A | 12/1957 | Elliot et al. |
| 2,890,472 A | 6/1959 | Olson |
| 2,932,843 A | 4/1960 | Zaiger et al. |
| 2,937,393 A | 5/1960 | Brueder |
| 2,946,078 A | 7/1960 | Deibel et al. |

(Continued)

FOREIGN PATENT DOCUMENTS

| | | |
|---|---|---|
| AR | 206463 | 7/1976 |
| AU | 409933 | 2/1971 |

(Continued)

*Primary Examiner* — Mark Spisich
*Assistant Examiner* — Andrew A Horton
(74) *Attorney, Agent, or Firm* — Feldman Gale, P.A.; Javier Sobrado; A. Robert Weaver

(57) ABSTRACT

Novel adapters, connectors and wiper blade assemblies including same for securing windshield wiper blades and arms are described, including those that accommodate side-saddle wiper arms. A wiper blade adapter may have a mounting portion comprising a wiper blade securing element, the wiper securing element being capable of securing a wiper blade, and a side-saddle portion comprising a connector securing element, the connector securing element being capable of securing a connector that is capable of securing a wiper arm.

24 Claims, 6 Drawing Sheets

(56) References Cited

U.S. PATENT DOCUMENTS

| | | |
|---|---|---|
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,116,510 A | 1/1964 | Oishei et al. |
| 3,132,367 A | 5/1964 | Wise |
| 3,139,644 A | 7/1964 | Smith |
| 3,147,506 A * | 9/1964 | Williams .................. 15/250.32 |
| 3,147,507 A | 9/1964 | Glynm |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,405,421 A | 10/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,631 A | 7/1972 | Yamadai et al. |
| 3,685,086 A | 8/1972 | Frohlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,537 A | 3/1975 | Bianchi |
| 3,879,793 A | 4/1975 | Schlegel |
| 3,881,213 A | 5/1975 | Tilli |
| 3,881,214 A | 5/1975 | Palu |
| D236,337 S | 8/1975 | Deibel |
| 3,942,212 A | 3/1976 | Steger et al. |
| D240,809 S | 8/1976 | Deibel |
| 3,995,347 A | 12/1976 | Kohler |
| 4,007,511 A | 2/1977 | Deibel |
| 4,009,504 A | 3/1977 | Arman |
| 4,028,770 A | 6/1977 | Appel |
| 4,047,480 A | 9/1977 | Vassiliou |
| 4,063,328 A | 12/1977 | Arman |
| D248,388 S | 7/1978 | Hughes |
| 4,102,003 A | 7/1978 | Hancu |
| 4,127,912 A | 12/1978 | Deibel et al. |
| 4,127,916 A | 12/1978 | Van den Berg et al. |
| D253,040 S | 10/1979 | Fournier et al. |
| D253,167 S | 10/1979 | Fournier et al. |
| D257,339 S | 10/1980 | Ellinwood |
| 4,308,635 A * | 1/1982 | Maiocco .................. 15/250.32 |
| 4,309,790 A | 1/1982 | Bauer et al. |
| 4,324,019 A * | 4/1982 | Mohnach et al. .......... 15/250.32 |
| 4,339,839 A | 7/1982 | Knights |
| 4,342,126 A | 8/1982 | Neefeldt |
| 4,343,063 A | 8/1982 | Batt |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,416,032 A * | 11/1983 | Mohnach et al. .......... 15/250.32 |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| D282,243 S | 1/1986 | Mason |
| D282,718 S | 2/1986 | Fireman |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| D295,020 S | 4/1988 | Franchi |
| 4,741,071 A | 5/1988 | Bauer et al. |
| D296,317 S | 6/1988 | Mower et al. |
| 4,760,934 A | 8/1988 | Netsch |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| D310,193 S | 8/1990 | Charet |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| 5,082,078 A | 1/1992 | Umeda et al. |
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |
| D324,667 S | 3/1992 | Williams |
| 5,093,954 A | 3/1992 | Kuzuno |
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |
| D336,739 S | 6/1993 | Wu et al. |
| 5,218,735 A | 6/1993 | Maubray |
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,307,536 A | 5/1994 | Lescher |
| 5,311,636 A | 5/1994 | Lee |
| 5,312,177 A | 5/1994 | Coulter |
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |

(56) References Cited

U.S. PATENT DOCUMENTS

| | | |
|---|---|---|
| D350,723 S | 9/1994 | Longazel |
| 5,349,716 A | 9/1994 | Millar |
| D353,354 S | 12/1994 | Oyama |
| 5,372,449 A | 12/1994 | Bauer et al. |
| 5,383,248 A | 1/1995 | Ho |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |
| 5,412,177 A | 5/1995 | Clark |
| 5,454,135 A | 10/1995 | Okuya et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| 5,497,528 A | 3/1996 | Wu |
| 5,509,166 A | 4/1996 | Wagner et al. |
| D370,199 S | 5/1996 | Kim |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| D375,289 S | 11/1996 | Waselewski et al. |
| 5,577,292 A | 11/1996 | Blachetta et al. |
| D376,792 S | 12/1996 | Chodkiewicz |
| 5,593,125 A | 1/1997 | Storz et al. |
| D377,754 S | 2/1997 | Abbott et al. |
| 5,628,085 A * | 5/1997 | Edele et al. ............... 15/250.32 |
| D379,613 S | 6/1997 | Chen |
| D382,848 S | 8/1997 | Chen |
| 5,661,870 A | 9/1997 | Eustache et al. |
| D389,449 S | 1/1998 | Hussaini |
| D390,823 S | 2/1998 | Baranowski et al. |
| D392,612 S | 3/1998 | Jonasson et al. |
| 5,732,437 A | 3/1998 | Jonasson et al. |
| D393,619 S | 4/1998 | Jeffer et al. |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| 5,836,110 A | 11/1998 | Buening |
| D402,953 S * | 12/1998 | Kim ............... D12/220 |
| D404,354 S | 1/1999 | Witek et al. |
| D406,094 S | 2/1999 | Lai |
| D406,257 S | 3/1999 | Lee |
| 5,875,672 A | 3/1999 | Fourie et al. |
| 5,885,023 A | 3/1999 | Witek et al. |
| 5,899,334 A | 5/1999 | Domerchie et al. |
| D411,161 S | 6/1999 | Wooten |
| D411,504 S | 6/1999 | Hsu |
| 5,907,885 A | 6/1999 | Tilli et al. |
| 5,920,947 A | 7/1999 | Varner |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,055,697 A | 5/2000 | Wollenschlaeger |
| 6,063,216 A | 5/2000 | Damm et al. |
| D427,134 S | 6/2000 | Lee |
| 6,088,872 A | 7/2000 | Schmid et al. |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| D444,760 S | 7/2001 | Houssat et al. |
| D445,754 S | 7/2001 | Benoit |
| 6,266,843 B1 | 7/2001 | Doman et al. |
| 6,279,191 B1 | 8/2001 | Kotlarski et al. |
| D448,295 S | 9/2001 | Mozes |
| 6,286,176 B1 | 9/2001 | Westermann et al. |
| 6,292,974 B1 | 9/2001 | Merkel et al. |
| 6,295,690 B1 | 10/2001 | Merkel et al. |
| 6,301,742 B1 | 10/2001 | Kota |
| 6,305,066 B1 | 10/2001 | De Paoli et al. |
| 6,308,373 B1 | 10/2001 | Merkel et al. |
| 6,327,738 B1 | 12/2001 | Lewis |
| 6,332,236 B1 | 12/2001 | Ku |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| D462,044 S | 8/2002 | Gfatter et al. |
| 6,427,282 B1 | 8/2002 | Kotlarski |
| 6,434,780 B1 | 8/2002 | Kotlarski |
| 6,449,797 B1 * | 9/2002 | De Block ............... 15/250.201 |
| 6,453,505 B1 | 9/2002 | Terai |
| D464,012 S | 10/2002 | Hussaini et al. |
| D464,600 S | 10/2002 | Chen |
| 6,499,181 B1 | 12/2002 | Kotlarski |
| D469,731 S | 2/2003 | Geer |
| 6,516,491 B2 | 2/2003 | Merkel et al. |
| 6,523,218 B1 | 2/2003 | Kotlarski |
| 6,530,111 B1 | 3/2003 | Kotlarski |
| D472,510 S | 4/2003 | Lin |
| D473,180 S | 4/2003 | Sun |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B1 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,962 S | 12/2004 | Lee et al. |

(56) References Cited

U.S. PATENT DOCUMENTS

| | | |
|---|---|---|
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B2 | 3/2005 | Siklosi |
| 6,874,195 B2 | 4/2005 | Kotlarski |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,512 B2 | 12/2005 | Dietrich et al. |
| 7,007,339 B2 | 3/2006 | Weiler et al. |
| 7,024,722 B2 | 4/2006 | Neubauer et al. |
| 7,036,181 B2 | 5/2006 | Zimmer |
| D522,380 S | 6/2006 | Dibnah et al. |
| 7,055,207 B2 | 6/2006 | Coughlin |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 | 12/2006 | Huang |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,228,588 B2 | 6/2007 | Kraemer et al. |
| D546,669 S | 7/2007 | Sheppard et al. |
| D547,713 S | 7/2007 | Goeller |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,337,900 B2 | 3/2008 | Reiber et al. |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D577,324 S | 9/2008 | McCray |
| D579,849 S | 11/2008 | Garrastacho et al. |
| 7,451,520 B2 | 11/2008 | Weiler et al. |
| D582,765 S | 12/2008 | Gustafson et al. |
| 7,461,429 B2 | 12/2008 | Huang |
| 7,464,433 B2 | 12/2008 | Thomar et al. |
| D584,160 S | 1/2009 | Zimmermann |
| 7,472,451 B2 | 1/2009 | Hara et al. |
| D586,663 S | 2/2009 | Tidqvist |
| D586,716 S | 2/2009 | Radfar |
| D586,717 S | 2/2009 | Depondt |
| D587,186 S | 2/2009 | Herinckx et al. |
| 7,484,264 B2 | 2/2009 | Kraemer et al. |
| 7,493,672 B2 | 2/2009 | Op't Roodt |
| D588,933 S | 3/2009 | Bonzagni et al. |
| 7,506,401 B2 | 3/2009 | Park |
| 7,509,704 B2 | 3/2009 | Bauer et al. |
| 7,523,519 B2 | 4/2009 | Egner-Walter et al. |
| 7,523,520 B2 | 4/2009 | Breesch |
| 7,523,522 B2 | 4/2009 | Herring et al. |
| 7,526,832 B2 | 5/2009 | Matsumoto et al. |
| 7,527,151 B2 | 5/2009 | Park |
| D593,480 S | 6/2009 | Kim |
| 7,543,353 B2 | 6/2009 | Ko |
| 7,552,502 B2 | 6/2009 | Kagawa et al. |
| D596,102 S | 7/2009 | Kim |
| 7,559,110 B1 | 7/2009 | Kotlarski et al. |
| D601,077 S | 9/2009 | Kim |
| 7,581,280 B2 | 9/2009 | Op't Roodt et al. |
| 7,581,887 B2 | 9/2009 | Zimmer |
| 7,596,479 B2 | 9/2009 | Weiler et al. |
| 7,603,741 B2 * | 10/2009 | Verelst et al. ............ 15/250.201 |
| 7,603,742 B2 | 10/2009 | Nakano et al. |
| 7,607,194 B2 | 10/2009 | Weber et al. |
| 7,614,499 B2 | 11/2009 | Mueller |
| 7,621,016 B2 | 11/2009 | Verelst et al. |
| 7,628,560 B2 | 12/2009 | Westermann et al. |
| 7,636,980 B2 | 12/2009 | Nakano |
| D608,717 S | 1/2010 | Aglassinger |
| D610,518 S | 2/2010 | Aglassinger |
| D610,519 S | 2/2010 | Aglassinger |
| D610,520 S | 2/2010 | Aglassinger |
| D611,809 S | 3/2010 | Borgerson et al. |
| 7,669,276 B2 | 3/2010 | Verelst et al. |
| 7,687,565 B2 | 3/2010 | Geilenkirchen |
| 7,690,073 B2 | 4/2010 | Marmoy et al. |
| 7,699,169 B2 | 4/2010 | Lewis |
| D615,918 S | 5/2010 | Kim |
| 7,707,680 B2 | 5/2010 | Hawighorst et al. |
| 7,716,780 B2 | 5/2010 | Scholl et al. |
| 7,743,457 B2 | 6/2010 | Metz |
| 7,748,076 B2 | 7/2010 | Weiler et al. |
| D621,322 S | 8/2010 | Lee et al. |
| 7,780,214 B2 | 8/2010 | Kraus et al. |
| 7,788,761 B2 | 9/2010 | Weiler et al. |
| 7,793,382 B2 | 9/2010 | Van De Rovaart |
| 7,797,787 B2 | 9/2010 | Wilms et al. |
| 7,805,800 B2 | 10/2010 | Wilms et al. |
| 7,810,206 B2 | 10/2010 | Weiler et al. |
| 7,814,611 B2 | 10/2010 | Heinrich et al. |
| 7,823,953 B2 | 11/2010 | Haas |
| 7,832,045 B2 | 11/2010 | Weiler et al. |
| 7,832,047 B2 | 11/2010 | Herinckx et al. |
| 7,836,542 B2 | 11/2010 | Dietrich et al. |
| 7,849,553 B2 | 12/2010 | Weiler et al. |
| 7,886,401 B2 | 2/2011 | Weber et al. |
| 7,891,043 B2 | 2/2011 | Kraus et al. |
| 7,891,044 B2 | 2/2011 | Fink et al. |
| 7,895,702 B2 | 3/2011 | Tisch et al. |
| 7,895,703 B2 | 3/2011 | Ina et al. |
| 7,898,141 B2 | 3/2011 | Hurst et al. |
| 7,899,596 B2 | 3/2011 | Zimmer |
| 7,908,703 B2 | 3/2011 | Van Bealen |
| 7,908,704 B2 | 3/2011 | Kraemer |
| 7,921,506 B2 | 4/2011 | Baek et al. |
| 7,926,659 B2 | 4/2011 | Kim |
| 7,930,796 B2 | 4/2011 | Weiler et al. |
| D637,132 S | 5/2011 | Kim |
| 7,937,798 B2 | 5/2011 | Fink et al. |
| 7,941,891 B2 | 5/2011 | Breesch |
| 7,941,892 B2 | 5/2011 | Kraus et al. |
| 7,945,985 B2 | 5/2011 | Stubner |
| 7,945,987 B2 | 5/2011 | Verelst et al. |
| 7,950,717 B2 | 5/2011 | Metz |
| 7,962,787 B2 | 6/2011 | Camilleri et al. |
| 7,966,689 B2 | 6/2011 | Rovaart et al. |
| 7,971,312 B2 | 7/2011 | Crabee et al. |
| 7,975,849 B2 | 7/2011 | Kim |

(56) References Cited

U.S. PATENT DOCUMENTS

| | | |
|---|---|---|
| 7,989,955 B2 | 8/2011 | Yagi |
| 7,996,953 B2 | 8/2011 | Braun et al. |
| D644,925 S | 9/2011 | Jaworski |
| 8,020,246 B2 | 9/2011 | Bauer et al. |
| 8,020,248 B2 | 9/2011 | Hasegawa |
| 8,020,249 B2 | 9/2011 | Masuda et al. |
| 8,026,645 B2 | 9/2011 | Stubner et al. |
| 8,042,690 B2 | 10/2011 | Lewis |
| D647,795 S | 11/2011 | Eaton et al. |
| 8,051,526 B2 | 11/2011 | Summerville et al. |
| 8,060,976 B2 | 11/2011 | Mayer et al. |
| 8,069,528 B2 | 12/2011 | Verelst et al. |
| 8,076,807 B2 | 12/2011 | Bohn et al. |
| D651,509 S | 1/2012 | Methe et al. |
| 8,096,013 B2 | 1/2012 | Eschenbrenner et al. |
| 8,099,823 B2 | 1/2012 | Kraemer et al. |
| 8,104,134 B2 | 1/2012 | Ritt |
| 8,104,136 B2 | 1/2012 | Carangelo |
| 8,117,710 B2 | 2/2012 | Kraus et al. |
| 8,125,111 B2 | 2/2012 | Bohn et al. |
| 8,141,198 B2 | 3/2012 | Wilms et al. |
| 8,148,467 B2 | 4/2012 | Pieters et al. |
| 8,151,656 B2 | 4/2012 | Nicgorski, II |
| D658,494 S | 5/2012 | Raimer et al. |
| 8,181,308 B2 | 5/2012 | Kwon et al. |
| 8,186,002 B2 | 5/2012 | Kinnaert et al. |
| 8,191,200 B2 | 6/2012 | Kim |
| 8,261,403 B2 | 9/2012 | Ehde |
| 8,261,405 B2 | 9/2012 | Kim et al. |
| 8,272,096 B2 | 9/2012 | Wilms et al. |
| 8,381,348 B2 | 2/2013 | Egner-Walter et al. |
| 8,413,291 B2 | 4/2013 | Wu |
| 8,434,621 B2 | 5/2013 | Hun et al. |
| D684,862 S | 6/2013 | DiFranza |
| 8,474,088 B2 | 7/2013 | Wu |
| 8,490,239 B2 | 7/2013 | Ehde |
| 8,505,724 B2 | 8/2013 | Bult et al. |
| 8,510,897 B2 | 8/2013 | Ku |
| 8,510,898 B2 | 8/2013 | Ku |
| 8,544,137 B2 | 10/2013 | Thienard |
| 8,555,456 B2 | 10/2013 | Ehde |
| D692,750 S | 11/2013 | Ehde et al. |
| 8,613,357 B2 | 12/2013 | Putnam |
| D702,619 S | 4/2014 | Kim |
| D704,620 S | 5/2014 | Kim |
| 2001/0013236 A1 | 8/2001 | Weyerstall et al. |
| 2002/0043092 A1 | 4/2002 | Jones et al. |
| 2002/0112306 A1 | 8/2002 | Komerska |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0159229 A1 | 8/2003 | Weiler et al. |
| 2003/0209049 A1 | 11/2003 | Jones et al. |
| 2003/0221276 A1 | 12/2003 | Siklosi |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0098821 A1 | 5/2004 | Kraemer et al. |
| 2004/0159994 A1 | 8/2004 | Lenzen et al. |
| 2004/0211021 A1 | 10/2004 | Weber et al. |
| 2004/0244137 A1 | 12/2004 | Poton |
| 2004/0250369 A1 | 12/2004 | Matsumoto et al. |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0166349 A1 | 8/2005 | Nakano et al. |
| 2005/0177970 A1 | 8/2005 | Scholl et al. |
| 2006/0010636 A1 | 1/2006 | Vacher |
| 2006/0112511 A1 | 6/2006 | Op't Roodt et al. |
| 2006/0117515 A1 | 6/2006 | Fink et al. |
| 2006/0130263 A1 | 6/2006 | Coughlin |
| 2006/0156529 A1 | 7/2006 | Thomar et al. |
| 2006/0179597 A1 | 8/2006 | Hoshino et al. |
| 2006/0218740 A1 | 10/2006 | Coughlin |
| 2006/0230571 A1 | 10/2006 | Son |
| 2006/0248675 A1 | 11/2006 | Vacher et al. |
| 2006/0282972 A1 | 12/2006 | Huang |
| 2007/0017056 A1 | 1/2007 | Cooke et al. |
| 2007/0067939 A1 | 3/2007 | Huang |
| 2007/0067941 A1 | 3/2007 | Huang |
| 2007/0089257 A1 | 4/2007 | Harita et al. |
| 2007/0186366 A1 | 8/2007 | Alley |
| 2007/0220698 A1 | 9/2007 | Huang |
| 2007/0226940 A1 | 10/2007 | Thienard |
| 2007/0226941 A1 | 10/2007 | Kraemer et al. |
| 2007/0234501 A1 | 10/2007 | Ho et al. |
| 2008/0083082 A1 | 4/2008 | Rovaart et al. |
| 2008/0098554 A1 | 5/2008 | Cho |
| 2008/0196192 A1 | 8/2008 | Yao |
| 2008/0222830 A1 | 9/2008 | Chiang |
| 2008/0263805 A1 | 10/2008 | Sebring |
| 2008/0289133 A1 | 11/2008 | Kim |
| 2009/0007364 A1* | 1/2009 | Jarasson et al. ............ 15/250.32 |
| 2009/0013492 A1 | 1/2009 | Henin |
| 2009/0064440 A1 | 3/2009 | Boland |
| 2009/0158545 A1 | 6/2009 | Grasso et al. |
| 2009/0172910 A1 | 7/2009 | De Block et al. |
| 2009/0178226 A1 | 7/2009 | Lee et al. |
| 2010/0005608 A1 | 1/2010 | Chien |
| 2010/0005609 A1 | 1/2010 | Kim |
| 2010/0024151 A1 | 2/2010 | Ku |
| 2010/0050360 A1 | 3/2010 | Chiang |
| 2010/0050361 A1 | 3/2010 | Chang et al. |
| 2010/0064468 A1 | 3/2010 | Kang |
| 2010/0083454 A1 | 4/2010 | Op't Roodt et al. |
| 2010/0205763 A1 | 8/2010 | Ku |
| 2010/0212101 A1 | 8/2010 | Thienard et al. |
| 2010/0236008 A1 | 9/2010 | Yang et al. |
| 2010/0236675 A1 | 9/2010 | Schneider |
| 2010/0242204 A1 | 9/2010 | Chien |
| 2010/0281645 A1 | 11/2010 | Kim et al. |
| 2011/0047742 A1 | 3/2011 | Kim et al. |
| 2011/0072607 A1 | 3/2011 | Van Baelen et al. |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277264 A1* | 11/2011 | Ehde ........................ 15/250.32 |
| 2011/0277266 A1 | 11/2011 | Umeno |
| 2012/0027206 A1 | 2/2012 | Suzuki et al. |
| 2012/0047673 A1 | 3/2012 | Depondt |
| 2012/0054976 A1 | 3/2012 | Yang et al. |
| 2012/0060316 A1 | 3/2012 | Avasiloaie et al. |
| 2012/0102669 A1 | 5/2012 | Lee et al. |
| 2012/0144615 A1 | 6/2012 | Song et al. |
| 2012/0159733 A1 | 6/2012 | Kwon |
| 2012/0180245 A1 | 7/2012 | Ku |
| 2012/0180246 A1 | 7/2012 | Ku |
| 2012/0279008 A1 | 11/2012 | Depondt |
| 2012/0311808 A1 | 12/2012 | Yang et al. |
| 2012/0317740 A1 | 12/2012 | Yang et al. |
| 2013/0067675 A1 | 3/2013 | Chien |
| 2013/0104334 A1 | 5/2013 | Depondt |
| 2013/0152326 A1 | 6/2013 | Oslizlo et al. |
| 2013/0152330 A1 | 6/2013 | Kim et al. |
| 2013/0167316 A1 | 7/2013 | Egner-Walter et al. |
| 2013/0192016 A1 | 8/2013 | Kim et al. |
| 2013/0247323 A1 | 9/2013 | Geubel et al. |
| 2013/0255026 A1 | 10/2013 | Depondt |
| 2013/0263400 A1 | 10/2013 | Duesterhoeft et al. |
| 2013/0333145 A1 | 12/2013 | Depondt |
| 2013/0333146 A1 | 12/2013 | Depondt |
| 2014/0026348 A1 | 1/2014 | Schaeuble |
| 2014/0026349 A1 | 1/2014 | Schaeuble |

FOREIGN PATENT DOCUMENTS

| | | |
|---|---|---|
| AU | 410701 | 2/1971 |
| AU | 649730 | 6/1994 |
| AU | 729371 | 7/2001 |
| AU | 741730 | 12/2001 |
| AU | 762557 | 6/2003 |

(56) References Cited

FOREIGN PATENT DOCUMENTS

| | | |
|---|---|---|
| AU | 770944 | 3/2004 |
| AU | 2003257828 | 3/2004 |
| AU | 780818 | 4/2005 |
| AU | 2006100618 | 8/2006 |
| AU | 2006241297 | 6/2007 |
| AU | 2006203445 | 10/2007 |
| AU | 2008100641 | 8/2008 |
| AU | 2009238193 | 10/2009 |
| AU | 2009324257 | 8/2010 |
| BR | 8304484 | 4/1984 |
| BR | 8604381 | 5/1987 |
| BR | 8707390 | 11/1988 |
| BR | 8903473 | 3/1990 |
| BR | 8907154 | 2/1991 |
| BR | 9005080 | 8/1991 |
| BR | 9105809 | 8/1992 |
| BR | 9200129 | 10/1992 |
| BR | 0006164 | 4/2001 |
| BR | 0007263 | 10/2001 |
| BR | 0106665 | 4/2002 |
| BR | 0106667 | 4/2002 |
| BR | 0306135 | 10/2004 |
| BR | PI0411532 | 8/2006 |
| BR | PI0506158 | 10/2006 |
| BR | 0006917 | 8/2009 |
| BR | PI0606903 | 8/2009 |
| BR | PI0901324 | 4/2010 |
| BR | PI0706762 | 4/2011 |
| BR | PI0621265 | 12/2011 |
| CA | 2515071 | 8/2004 |
| CA | 2500891 | 5/2011 |
| CA | 2789431 | 8/2011 |
| CA | 2809243 | 3/2012 |
| CA | 2809292 | 3/2012 |
| CA | 2809947 | 3/2012 |
| CA | 2835703 | 11/2012 |
| CA | 2843527 | 1/2013 |
| CA | 2843637 | 2/2013 |
| CA | 2843644 | 2/2013 |
| CA | 2797693 | 5/2013 |
| CA | 2799267 | 6/2013 |
| CA | 2740384 | 7/2013 |
| CN | 101983148 | 3/2011 |
| CN | 202593459 | 12/2012 |
| CN | 102963337 | 3/2013 |
| CN | 102991462 | 3/2013 |
| CN | 102991466 | 3/2013 |
| CN | 103101514 | 5/2013 |
| CN | 103101516 | 5/2013 |
| CN | 103108782 | 5/2013 |
| CN | 103183008 | 7/2013 |
| CN | 103183009 | 7/2013 |
| CN | 103223923 | 7/2013 |
| CN | 103228498 | 7/2013 |
| DE | 3919050 A1 | 12/1990 |
| DE | 10228494 A1 | 1/2004 |
| EP | 1612113 | 1/2006 |
| EP | 1849666 A1 | 10/2007 |
| FR | 2736025 A1 | 1/1997 |
| FR | 2738201 A1 | 3/1997 |
| FR | 2747976 | 10/1997 |
| GB | 2220844 A | 1/1990 |
| GB | 2348118 A | 9/2000 |
| HK | 1110560 | 5/2010 |
| HK | 1105928 | 8/2010 |
| HK | 1108573 | 10/2011 |
| HK | 1110561 | 7/2012 |
| JP | 60092136 A | 5/1985 |
| JP | 2008037388 A | 2/2008 |
| KR | 10-089115 | 2/2009 |
| MX | PA06008594 | 8/2006 |
| MX | 2012002314 | 6/2012 |
| MX | 2013002710 | 5/2013 |
| MX | 2013006881 | 7/2013 |
| MY | 122308 | 4/2006 |
| MY | 122563 | 4/2006 |
| MY | 128028 | 1/2007 |
| MY | 128970 | 3/2007 |
| PT | 1800977 | 1/2012 |
| TW | M404153 U1 | 5/2011 |
| TW | 201325952 | 7/2013 |
| TW | 201325953 | 7/2013 |
| WO | 2010033646 | 3/2010 |

* cited by examiner

WINDSHIELD WIPER ADAPTER, CONNECTOR AND ASSEMBLY

CROSS REFERENCE TO RELATED APPLICATIONS

This application claims the benefit of U.S. Provisional Application No. 61/512,492 filed Jul. 28, 2011, the disclosure of which is hereby incorporated herein by reference in its entirety.

FIELD AND RELATED ART

This invention relates in general to windshield wipers, and more particularly, to an improved adapter or connector for a windshield wiper that allows the windshield wiper to be attached to multiple types of windshield wiper arm configurations in side saddle position. The invention is also directed to windshield wipers incorporating these novel adapters.

There are a variety of wiper arms on which wiper blades are provided as original equipment. These various wiper arms have hooks, pins, or other configurations which may connect to the wiper blade with or without connectors. These various configurations have created a problem in the replacement market because wiper blade providers are required to have multiple wiper blade configurations to accommodate all of the existing wiper arms. It is therefore advantageous to have attachment structures that can accommodate a host of arms to reduce the complexity and cost associated with plurality of wiper blade arm configuration.

The need to attach replacement windshield wiper blades to multiple arms has been addressed to some degree. For example, windshield wiper blades have been designed to work with various hook-type wiper arms having different sizes. Connectors may also be configured to receive either a pin-type arm, a hook-type arm and a variety of other arms, such as described in U.S. Pat. No. 6,640,380, which is incorporated herein by reference in its entirety. An adapter may also be used to connect the arm to a windshield wiper. As that term is used herein, an adapter is a separate structure that works together with the connector to allow the windshield wiper to connect to a type of wiper arm. An example adapter is described in U.S. Patent No. 2002/0192017, which is incorporated herein by reference in its entirety, wherein an adapter is used to allow a large hook to connect to a wiper blade having a connector that accommodates only small hook arms. Although these connectors and adapters may increase the usefulness of a given windshield wiper such that it can be used with different wiper arm types, the connectors are often expensive and have complicated structures that are difficult and time-consuming to manufacture.

Whereas many automobiles on the market have arms that attach to a wiper blade directly over the wiper strip (i.e., hooks that connect inside of, or pin arms where the pin enters into, a mounting base or other connecting device that is above the wiper strip), more recent automobiles contain wiper arms that are designed to attach to the side of a wiper blade. These wiper arms (sometimes referred to herein as "side-saddle wiper arms") are generally provided on vehicles with a specially designed wiper blade that is designed to connect only to that specific type of arm and require special mounting bases or connectors designed to accommodate such an arm. When the wiper blade must be replaced, the replacement must generally be done at a car dealership and requires the purchase of an expensive replacement part. Moreover, there are several versions of these wiper arms, some of which have varying lengths, locking arms or spacers. Accordingly, an aftermarket provider that offers windshield wipers that are not directed to a specific car must evaluate whether to add a separate connector to accommodate each particular side saddle wiper arm. This leaves consumers with vehicles having the new wiper arms with fewer, usually more expensive, alternatives for replacement windshield wipers.

Thus, there is a need for an inexpensive adapter or connector that is capable of securing a windshield wiper blade to a variety of arms, including side-saddle wiper arms. In particular, it would be desirable to have an adapter or connector that can be attached to a wiper blade and that preferably can be used with at least one connector that will allow the wiper blade to be locked to a wide variety of these side-saddle wiper arms, regardless of their various locking arm mechanisms or whether the arm includes a spacer. It would also be desirable to have a windshield wiper adapter or connector that can be fabricated or molded as a single piece (or with few pieces) at low-cost that can accommodate a wide variety of side-saddle wiper arms. The prior art fails to provide a low-cost windshield wiper adapter or connector capable of attachment to a wide variety of these side-saddle wiper arms, much less for the purpose of reducing the amounts of inventory parts required to supply a vehicle market that uses a wide variety of pin-type windshield wiper arm types.

SUMMARY

The following presents a simplified summary of the invention in order to provide a basic understanding of some aspects of the invention. This summary is not an extensive overview of the invention. Rather than specifically identify key or critical elements of the invention or to delineate the scope of the invention, its purpose, inter alia, is to present some concepts of the invention in a simplified form as a prelude to the more detailed description that is presented later.

The invention is generally directed to novel adapters and connectors for windshield wiper blades, including those that accommodate side-saddle wiper arms. More particularly, the invention relates, in part, to a single-piece (or few-piece) windshield wiper adapter or connector that can accommodate multiple pin-type windshield wiper arms having varying pin lengths and locking mechanisms. The invention is also directed to wiper blades incorporating the adapters and connectors described herein.

In certain embodiments, the adapter or connector provides a side-to-side aperture to accommodate a retaining pin, and an aperture and an outside edge on its upper surface to accommodate locking arms of varying sizes and configurations that may attach to the connector.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

BRIEF DESCRIPTION OF THE DRAWINGS

The following description and the annexed drawings set forth certain illustrative aspects of the invention. These aspects are indicative of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION

Figure 1:
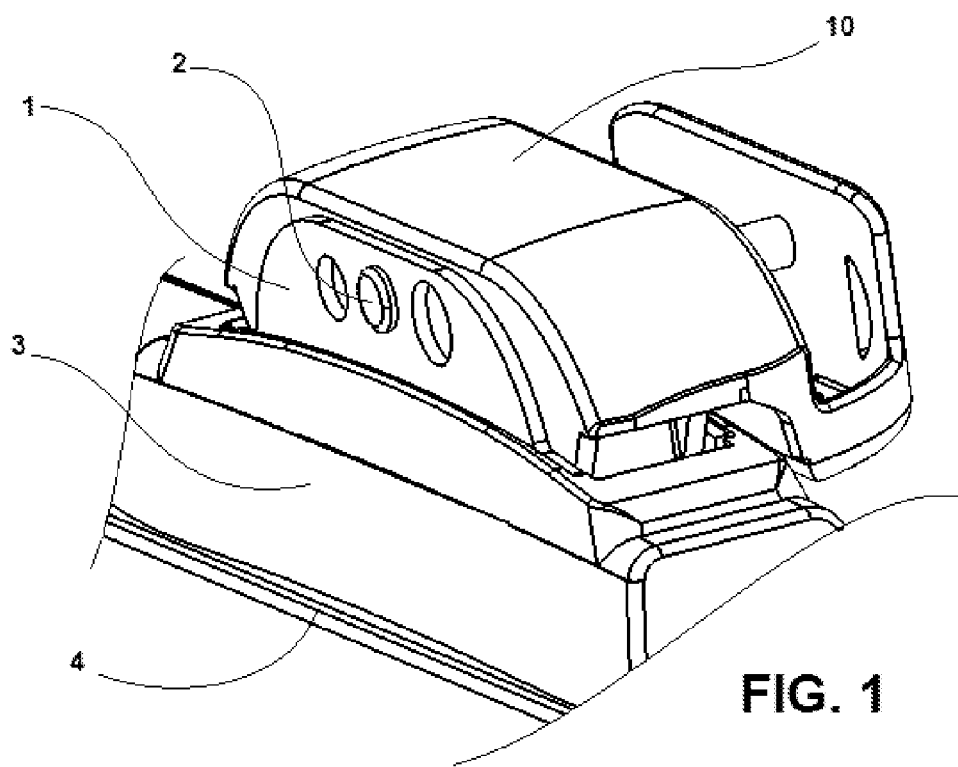
FIG. 1 is a perspective view of an embodiment of an adapter of the present invention attached to a wiper blade.

The foregoing summary, as well as the following detailed description of certain embodiments of the subject matter set forth herein, will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents.

In the description that follows, like numerals or reference designators will be used to refer to like parts or elements throughout. In this document, the terms "a" or "an" are used, as is common in patent documents, to include one or more than one. In this document, the term "or" is used to refer to a nonexclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property. As used herein, an adapter is a separate structure that works together with the connector to allow the windshield wiper to connect to a type of wiper arm.

In certain embodiments, a wiper blade adapter may have a mounting portion comprising a wiper blade securing element, the wiper securing element being capable of securing a wiper blade, and a side-saddle portion comprising a connector securing element, the connector securing element being capable of securing a connector that is capable of securing a wiper arm.

In some embodiments mounting portion may have a rivet clip. In some such embodiments, the mounting portion may also have a pair of mounting side walls, and wherein the rivet clip is embodied on each of the mounting side walls.

In some embodiments, the wiper blade adapter may have a connector securing element that also has a rivet capable of engaging a rivet clip on the connector in order to secure the connector. In some embodiments the wiper blade adapter's side saddle portion may have at least one reinforcing member. In some embodiments the at least one reinforcing member may include a vertical reinforcing member. In some embodiments the at least one reinforcing member may include a horizontal reinforcing member. In some embodiments, the at least one reinforcing member may include a transverse reinforcing member.

In certain embodiments, a wiper blade assembly may have a wiper blade and an adapter having a mounting portion comprising a wiper securing element, the wiper securing element being capable of securing the adapter to wiper blade and a side-saddle portion comprising a connector securing element, the connector securing element being capable of securing a connector, and the connector being capable of securing a wiper arm.

In some embodiments the wiper blade assembly's mounting portion may have a rivet clip. In some embodiments the mounting portion may also have a pair of mounting side walls, and wherein the rivet clip is embodied on each of the mounting side walls. In some embodiments, the wiper blade assembly's connector securing element may also have a rivet capable of engaging a rivet clip on the connector in order to secure the connector.

In some embodiments the wiper blade assembly's side saddle portion may also have at least one reinforcing member. In some such embodiments the at least one reinforcing member includes a vertical reinforcing member. In some such embodiments, the at least one reinforcing member includes a horizontal reinforcing member. In some such embodiments, the at least one reinforcing member includes a transverse reinforcing member.

In some embodiments, the wiper blade assembly may also have a connector capable of securing to the connector securing element, and further capable of securing a wiper arm.

In certain embodiments a wiper blade connector may have a mounting portion comprising a wiper securing element, the wiper securing element being capable of securing a wiper blade and a side-saddle portion comprising a connector member, the connector member being capable of securing a wiper arm.

In some embodiments the wiper blade connector's mounting portion may have a rivet clip. In some embodiments, the wiper blade connector mounting portion may also have a pair of mounting side walls, wherein the rivet clip is embodied on each of the mounting side walls.

In one aspect, the invention is generally directed to an adapter or a connector for a windshield wiper (or a windshield wiper incorporating same) that allows one windshield wiper to be secured to multiple types of windshield wiper arms, each arm having a different configuration. The adapter may be designed for use with multiple different windshield wiper arms that are secured to a wiper blade in side-saddle fashion, e.g., in a manner whereby the arm attaches to the side of a wiper blade.

In certain embodiments, the adapter is configured to have a first portion and a second portion. In certain preferred embodiments, the first portion is a mounting portion configured to connect to a wiper blade. In certain preferred embodiments, the second portion is a side-saddle portion configured to connect to a wiper arm via the use of a connector.

In certain embodiments, the adapter may be configured such that the orientation of either the windshield wiper or the connector can be reversed based on the particular windshield wiper arm that is being used.

In certain embodiments, the present invention provides a wiper blade adapter comprising a mounting portion comprising a wiper securing element, the wiper securing element being capable of securing a wiper blade; a side-saddle portion comprising a connector securing element, the connector securing element being capable of securing a connector, and the connector being capable of securing a wiper arm.

In certain embodiments, the present invention provides a wiper blade assembly comprising a wiper blade; and an adapter comprising a mounting portion comprising a wiper securing element, the wiper securing element being capable of securing a wiper blade; and a side-saddle portion comprising a connector securing element, the connector securing element being capable of securing a connector, and the connector being capable of securing a wiper arm.

In certain embodiments, the present invention provides a wiper blade connector comprising a mounting portion comprising a wiper securing element, the wiper securing element being capable of securing a wiper blade; and a side-saddle portion comprising a connector member, the connector member being capable of securing a wiper arm.

FIG. 1 is a perspective view of an embodiment of the adapter 10 attached to a wiper blade having a mounting base 1 with a rivet 2, a cover 3 for the base of the mounting base 1, and a wiper strip 4. The adapter 10 as shown is attached to the rivet 2 of mounting base 1 of the wiper blade.

Figure 2:
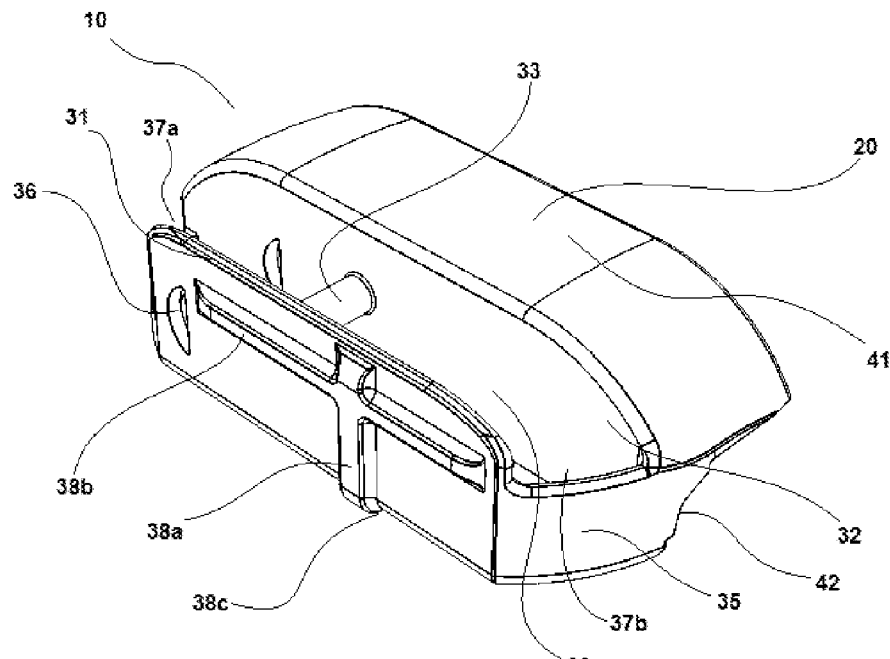
FIG. 2 is a perspective view of an embodiment of an adapter of the present invention viewed from above.
Figure 3:
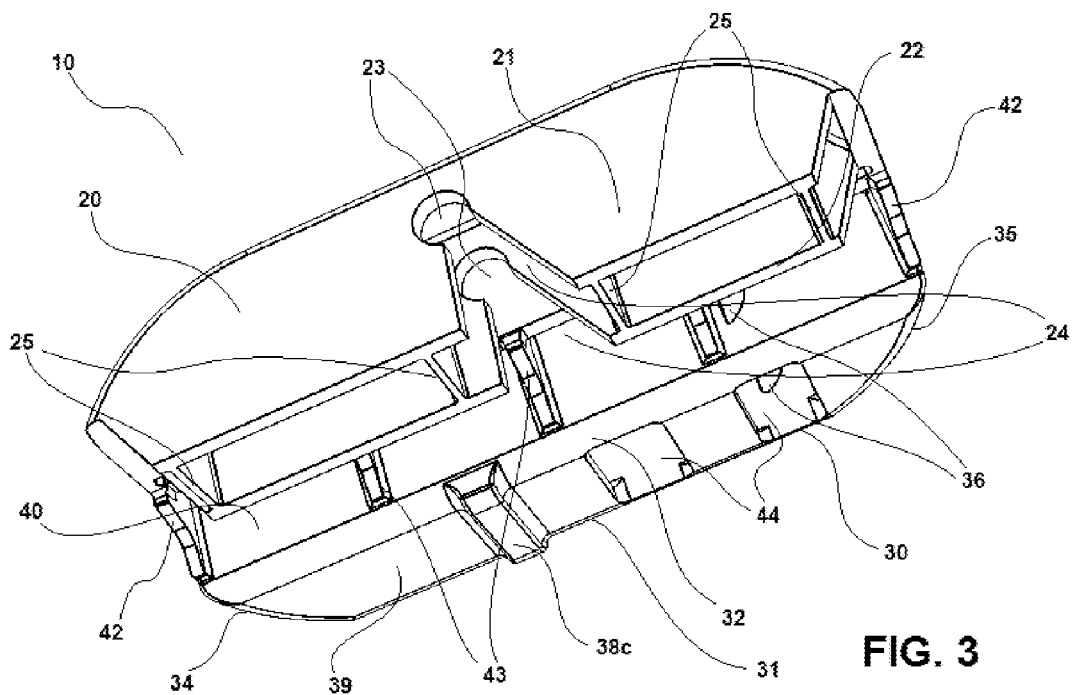
FIG. 3 is a perspective view of an embodiment of an adapter of the present invention viewed from below.

FIGS. 2-9 provide various views of an embodiment of an adapter 10 of the present invention. FIGS. 2 and 3 are perspective views of adapter 10 from above and below, respectively. FIG. 2 shows certain structures that may be present in the side-saddle, or second, portion 30 of the adapter 10. FIG. 3 shows certain structures present in the mounting, or first, portion 20 of the adapter 10, as well some features on the bottom of the side saddle portion 30.

The side-saddle, or second, portion 30 of the adapter 10 is configured to receive a connector 5. Generally speaking, the side-saddle portion 30 includes a connector securing element to which a connector can be secured. In certain embodiments, the connector can be pivotally secured to the connector securing element such that it can move about an axis. In certain embodiments, such as the exemplary embodiment in FIGS. 2-9, the connector securing element may be a side-saddle rivet 33 which may be used to secure a connector 5 having a rivet passage and clip. The connector 5 may be virtually any connector compatible with the connector securing element and includes, without limitation, the connector 5 described in U.S. Pat. No. 6,640,380.

Other connector securing elements for connecting an adapter 10 to a connector 5, including well-known methods for attaching connectors to wiper blades, are contemplated within the scope of the present invention. These include having pin passages and pin clips which connect to one or more pins in the adapter; having one or more detents in the connector which engage shoulders in apertures or recesses in the adapter; having recesses in the peripheral wall of the connector that can accept and secure a rivet or pin; having deflectable or rigid pins or detents in the connector, which engage corresponding recesses, apertures or shoulders in the adapter; and other form-fitting or friction fitting connections and the like.

In certain embodiments the side saddle portion 20, has two side-saddle side walls 31, 32 appropriately spaced apart from one another. The side-saddle portion 20 may also have one or more end walls 34, 35. The end walls 34, 35, if present, may serve to provide additional structural support for the side-saddle side walls 31, 32. The side saddle side walls 31, 32 and end walls 34, 35 may define a hook arm passage way, which may have a hook insertion passageway 37*a* (e.g., for the hook of a hook arm), and a hook rod passageway 37*b* (e.g., for the rod of a hook arm) which accommodate a hook arm when it is secured to a connector 5 on the adapter 10.

In certain embodiments, the side-saddle side walls 31, 32 may have wing apertures 36 (or recesses) which may allow the wings of a connector 5 to extend laterally in order to facilitate the insertion of a hook-type wiper arm. The side saddle portion 30 may also have a floor 39, which may connect, in whole or in part, the side-saddle side walls 31, 32 and end walls 34, 35. The adapter 10 may have apertures 44 in the floor 39, as shown, or elsewhere, to reduce the amount of material used, to facilitate molding, or confer additional benefits.

The side-saddle portion 30 of the adapter 10 may also have reinforcing members which may impart structural support to the adapter 10. The reinforcing members may be provided in any location and travel in any direction, including vertical, horizontal or transverse, as illustrated in 38*a*, 38*b* and 38*c*.

Generally speaking, the adapter 10 may have various shapes and sizes depending upon the application in question. In certain embodiments, the adapter is configured to accommodate the shape of the wiper blade, including the shape of the wiper blade's mounting base 1, cover 2, or both. In certain embodiments, the adapter 10 may have a contoured edge 42.

The mounting, or second, portion 20 of the adapter 10 is configured to connect the adapter to a wiper blade, and has a wiper securing element which secures the adapter to a wiper blade. As shown in the exemplary embodiment in FIG. 3, the mounting portion 20 may have spaced apart mounting side walls 21, 22, and the wiper securing element may be a rivet clip 23 in each of the mounting side walls 21, 22. In this embodiment, connection is made to a wiper blade via the rivet 2 of a wiper blade being positioned in the rivet passages 24 of the mounting side walls 21, 22 of the mounting portion 20 of the adapter 10. The adapter 10 may be pushed down onto the wiper such that the rivet 2 passes through the rivet passages 24 and into the rivet clip 23.

Other methods for connecting an adapter 10 to a wiper blade known in the art are contemplated within the scope of the present invention, including having pin passages and pin clips which connect to one or more pins in the wiper blade; having one or more detents in the adapter 10 which engage shoulders in apertures or recesses in the wiper blade; having recesses in the peripheral wall of the connector that can accept and secure a rivet or pin; having deflectable or rigid pins or detents in the adapter 10, which engage corresponding recesses, apertures or shoulders in the wiper blade; and other form-fitting or friction fitting connections and the like.

The mounting portion 20 of the adapter 10 may also have reinforcing walls 25 extending between the mounting side walls 21, 22 for purposes of structural rigidity, reinforcement, or other purposes. Alternatively, reinforcing ribs 43, reinforcing members 38, or other features may also be used to reinforce the mounting side walls 21, 22.

The adapter 10 may optionally feature one or more interim walls 40 between the mounting portion 20 and the side-saddle portion 30. The interim walls may feature reinforcing ribs 43 that can be used to provide structural support to the inner side-saddle side wall 32. Additionally, the interim wall 40 may be joined to the inner mounting side wall 22 to provide additional structural support.

Figure 4:
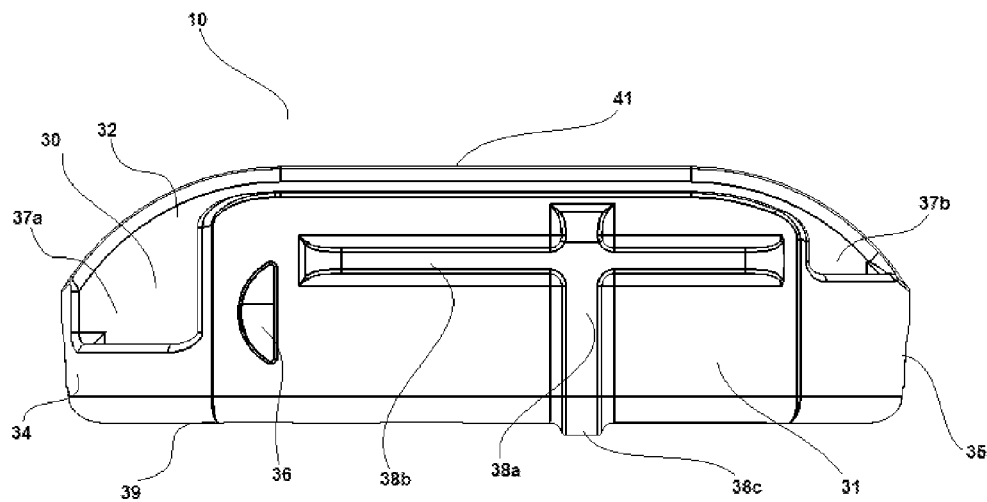
FIG. 4 is a side view of an embodiment of an adapter of the present invention showing a side-saddle, or second, portion of the adapter.

FIG. 4 shows a side view of the exemplary embodiment of adapter 10, showing side-saddle side walls 31, 32, each having a wing aperture 36, end walls 34, 35, a hook insertion passageway 37a and a hook rod passageway 37b, and reinforcing members 38a, 38b and 38c.

Figure 5:
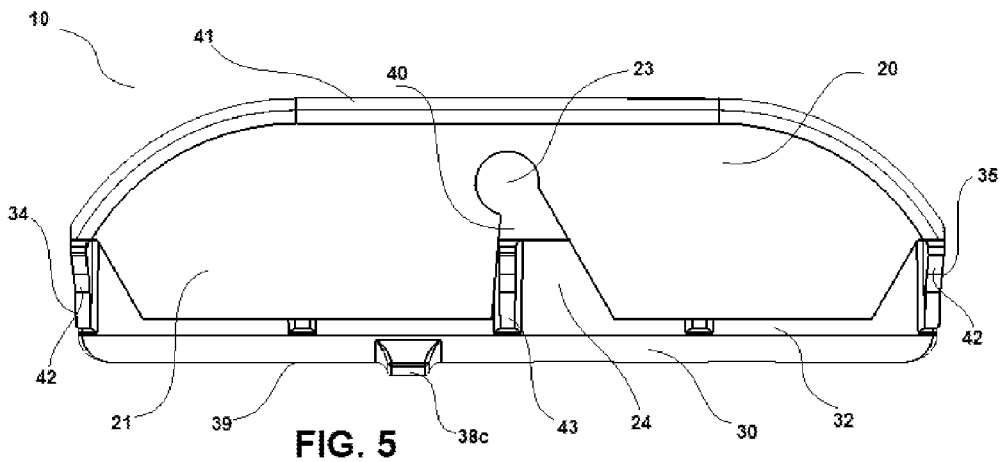
FIG. 5 is a side view of an embodiment of an adapter of the present invention showing a mounting, or first, portion of the adapter.

FIG. 5 shows a side view of the exemplary embodiment of adapter 10 showing the outer mounting wall 21, having a rivet clip 23 and a rivet passage 24. Through the rivet clip 23, the interim wall 40 can be seen, together with the reinforcing rib 43 connecting the interim wall 40 to the inner side-saddle side wall 22. The contour edges 42 which may be adapted to the shape of the wiper blade are also shown.

Figure 6:
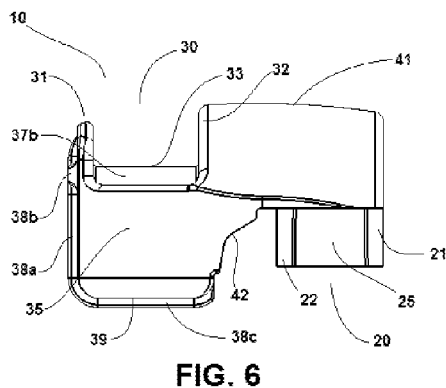
FIG. 6 is an end view of an embodiment of an adapter of the present invention showing an end where the rod of a hook arm may reside when a hook arm is attached.

FIG. 6 shows an end view of the exemplary embodiment of adapter 10, on the side where the rod of a hook arm may reside when the hook arm is connected. The end wall 35 and side walls 31, 32 of the side-saddle portion 30 are shown, and form the hook rod passageway 37b. The side-saddle rivet 33, reinforcing members 38a, 38b and 38c, contour edge 42, and the bottom of the mounting portion 20 with its mounting sidewalls 21, 22 and reinforcing wall 25 are also shown.

Figure 7:
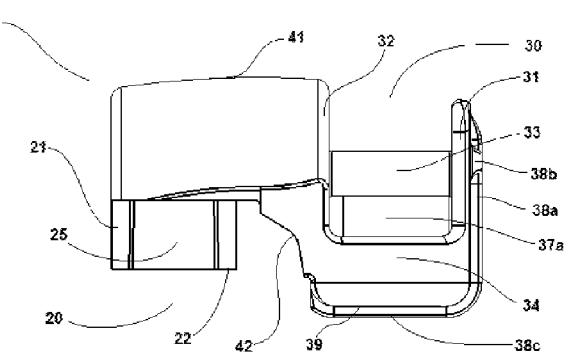
FIG. 7 is an end view of an embodiment of an adapter of the present invention showing an end where the hook of a hook arm may reside when a hook arm is attached.

FIG. 7 shows the opposite end view of the exemplary embodiment of adapter 10 where the hook of a hook arm may reside when a hook arm is secured to adapter 10. The features shown are similar to those depicted in FIG. 6, except that FIG. 7 shows that the hook insertion passageway 37a may be made larger than the hook rod passageway 37b to facilitate the insertion of a hook arm into the adapter 10.

Figure 8:
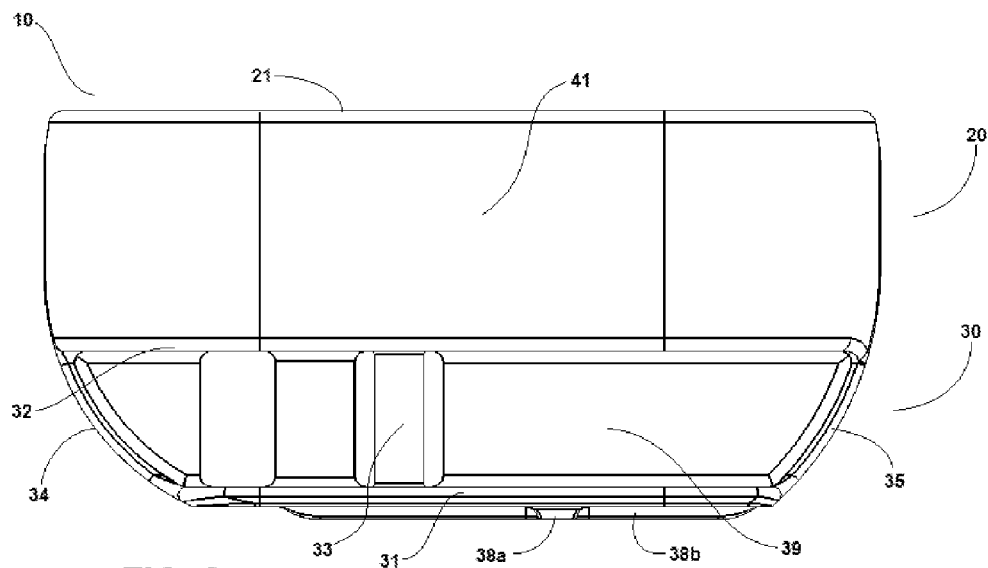
FIG. 8 is a top view of an embodiment of an adapter of the present invention.

FIG. 8 shows a top view of the exemplary embodiment of adapter 10, showing side saddle portion 30 and its side-saddle rivet 33, side-saddle side walls 31, 32, end walls 34, 35, floor 39, and reinforcing members 38a, 38b. Also shown are top surface 41 over the mounting portion 20, and the outer mounting wall 21.

Figure 9:
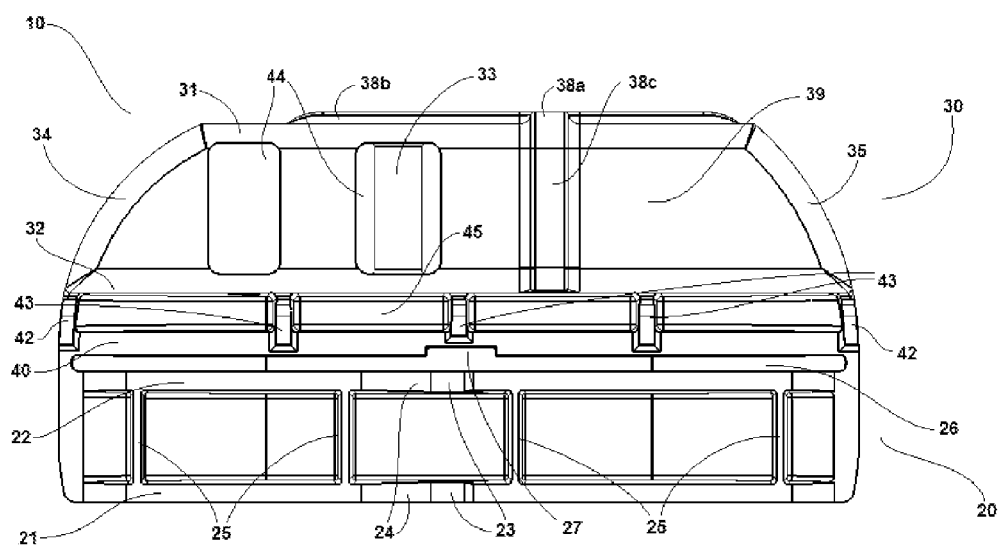
FIG. 9 is a bottom view of an embodiment of an adapter of the present invention.

FIG. 9 shows a bottom view of the exemplary embodiment of adapter 10, which shows the floor 39, side-saddle side walls 31, 32, rivet 33, end walls 34, 35, and reinforcing members 38a, 38b and 38c of side-saddle portion 30. Also shown are mounting side walls 21, 22, reinforcing walls 25, rivet clips 23, and rivet passages 24 of mounting portion 20. This embodiment features an interim wall 40 having reinforcing ribs 43 connecting to the inner side saddle wall 32, and a rivet end recess 27 which accommodates the outer bump of the rivet 2 of a wiper blade (which can be seen in FIG. 1). A mounting base wall gap 26 can also be seen, which allows the wall of mounting base 1 to pass through when adapter 10 is connected to a wiper blade. Another optional feature shown in this embodiment is an interim gap 45 between the interim wall 40 and the inner side saddle wall 32.

Figure 10:
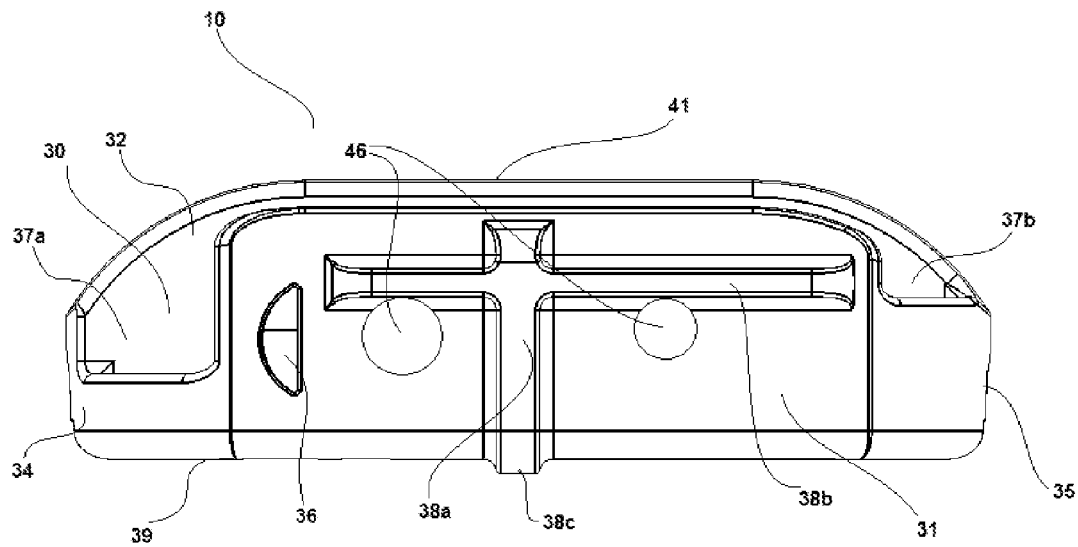
FIG. 10 is a side view of an embodiment of an adapter of the present invention showing a side saddle, or second portion.
Figure 11:
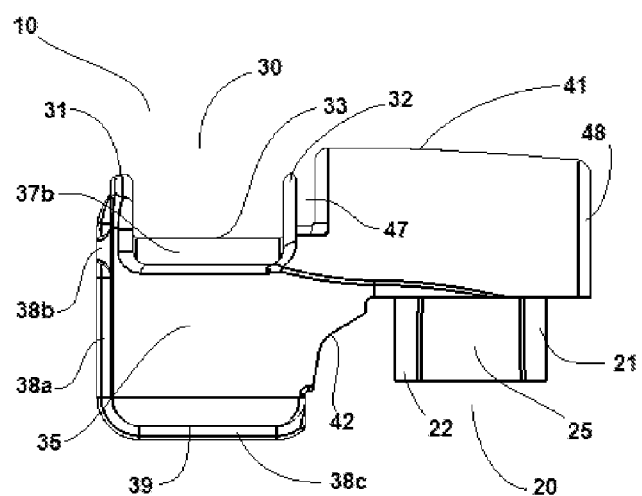
FIG. 11 is an end view of an embodiment of an adapter of the present invention showing an end where the rod of a hook arm may reside when a hook arm is attached.

FIGS. 10 and 11 show additional optional features that may be included in an exemplary embodiment of adapter 10, including pin apertures 46 for accommodating pin-type wiper arms, and an inner longitudinal groove 47 which allows adapter 10 to accommodate connector 5.

Figure 12:
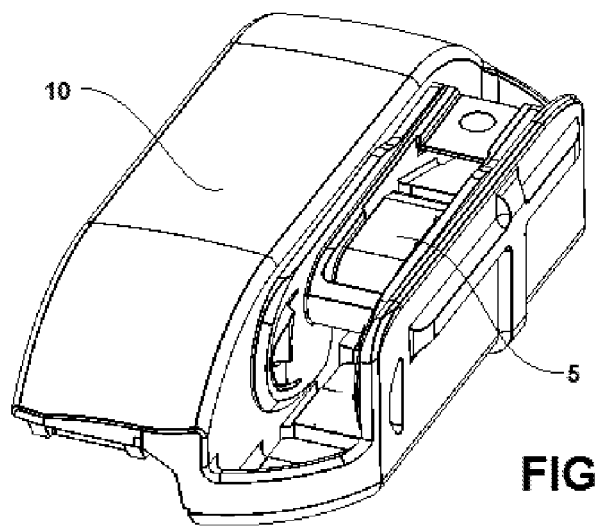
FIG. 12 is a perspective view of an embodiment of an adaptor of the present invention, with a connector of the type described in U.S. Pat. No. 6,640,380 attached thereto.
Figure 13:
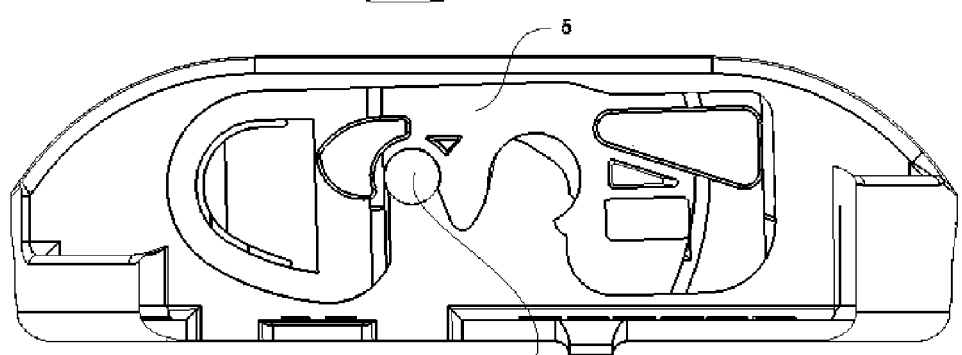
FIG. 13 is a cross-sectional side view of a side saddle, or second, portion of an embodiment of an adapter of the present invention, from behind an outer side wall of a side saddle portion of the adapter, with a connector of the type described in U.S. Pat. No. 6,640,380 attached thereto.

FIGS. 12 and 13 show adapter 10 with a connector 5 of the type described in U.S. Pat. No. 6,640,380, which is clipped onto the side-saddle rivet 33. It will be appreciated that connector 5 is for illustrative purposes, and as such, adapter 10 can be configured to accommodate any type of connector known in the art depending on the particular wiper arm.

Figure 14:
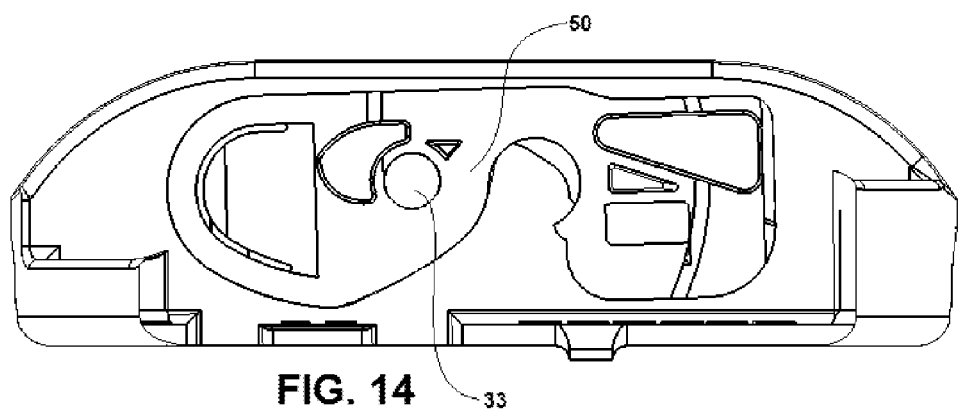
FIG. 14 is a cross-sectional side view of a side saddle, or second, portion of an embodiment of a connector of the present invention, from behind an outer side wall of a side-saddle portion of the connector.

FIG. 14 shows another embodiment of the invention. In this embodiment, a connector member 50 is used in place of connector 5 to connect to a wiper arm. The connector shown in this embodiment is a single structure that may be attached to a wiper blade to connect it to a side saddle wiper arm. The connector member 50 is preferably able to pivot about the side saddle rivet 33. Persons of skill in the art will appreciate that various types of connector members 50 can be used to accommodate various types of wiper arms within the teachings of the invention.

Those skilled in the art will recognize that adapter 10 can be fabricated from any suitable material known in the art, including without limitation, rigid or elastic plastics, metals, synthetic and natural rubber compounds, etc. Certain embodiments contemplate materials that can be molded such that connector 10 is fabricated as a single piece. In certain embodiments, more than one piece may be used, whereby each piece may be of the same or different materials. For example, certain embodiments may use a metal side-saddle rivet 33 on an otherwise molded plastic adapter 10.

In operation, the windshield wiper adapter 10 or connector 50 allows a single windshield wiper to be used in conjunction with windshield wiper arms having a wide variety of configurations. This confers many advantages, including without limitation, facilitating manufacturing, reducing cost, and allowing for easy replacement of windshield wipers.

Another embodiment of the invention is a wiper blade provided with an adapter or connector, including adapter 10 or connector 50 described above, or as shown in FIGS. 1-14. The wiper blade may be of any type suitable for use with the present invention. For example, the wiper blade can be a traditional wiper blade having a plurality of frames which carry a wiper strip, and having a mounting base. Alternatively, the wiper blade may be a beam blade, having one or more spring-elastic beams, a wiper strip, and a mounting base. The wiper blade may also be a hybrid wiper blade, which has a combination of a beam and one or more frames, a wiper strip, and a mounting base.

Regardless of the type of wiper blade, the adapter or connector can be adapted to connect to the wiper blade, for example, via a rivet on the wiper blade (which is commonly located in a mounting base or in the frame of the wiper blade) and a rivet passage 24 and rivet clips 23 on the mounting portion 30 of the adapter or connector. Any other method discussed above or otherwise known in the art would also be suitable, such as having one or more pins, holes, recesses, channels, or other structure in the wiper blade, and having corresponding pin clips, detents or pins or any other structure complimentary to the structure in the adapter or connector.

In certain embodiments, the adapter or connector may be connected to the wiper blade prior to connecting to the wiper arm. In certain embodiments, the adapter or connector may be connected to the wiper arm prior to being connected to the wiper blade. In certain embodiments, the adapter or connecter may either be first connected to the wiper arm or to the wiper arm.

Those skilled in the art will recognize that while the invention will most likely be used in conjunction with automobiles, it is suitable for use with any vehicle. For example, in addition to automobiles, trucks, buses, locomotives, aircrafts, or any other vehicle type that uses a windshield wiper can benefit from the present invention.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter disclosed herein without departing from its scope. The description above of the exemplary embodiments is not intended to be limiting. While specific embodiments have been discussed herein to explain the invention, it will be understood by those of ordinary skill in the art that the descriptions herein are intended as illustrative, and not as limiting, and that variations in the embodiments can be made without departing from the spirit of the invention.

For example, the type of materials, the number, configuration or position of the various features can vary so long as they are capable of performing their intended function as described herein.

What is claimed is:

1. A wiper blade adapter comprising:
   a side saddle portion including
      an outer side saddle wall and an inner side saddle wall together defining an elongate side saddle passage, and
      a side saddle rivet provided substantially within the side saddle passage, the side saddle rivet oriented substantially transverse to the side saddle passage, the side saddle rivet dimensioned to be securable within an arcuate rivet clip of a wiper blade connector;
   a mounting portion including
      an outer mounting wall and an inner mounting wall together defining an elongate mounting passage, the side saddle passage substantially parallel with the mounting passage,
   an interim gap between the inner mounting wall and the inner side saddle wall, the interim gap substantially parallel to the mounting passage and the side saddle passage;
   an interim wall within the interim gap, the interim wall substantially elongate and oriented substantially parallel to the interim gap, the interim wall provided along at least the majority of the length of the interim gap; and
   a rivet end recess provided in the interim wall adjacent to the arcuate rivet clip.

2. The wiper blade adapter of claim 1, the mounting portion further including an arcuate rivet clip defined in each of the first and second side mounting walls, the arcuate rivet clip pivotally connectable with a rivet provided on the wiper blade.

3. The wiper blade adapter of claim 1, wherein the mounting passage includes a plurality of reinforcing walls oriented substantially transverse to the mounting passage.

4. The wiper blade adapter of claim 1 further comprising a top surface, the top surface provided between the outer mounting wall and the inner side saddle wall,
   wherein the inner mounting wall is positioned between the outer mounting wall and the inner side saddle wall, and the inner mounting wall and the interim wall away from the top surface, the mounting passage thereby defined by the outer mounting wall, the inner mounting wall, and an area of the top surface between the outer and inner mounting walls.

5. The wiper blade adapter of claim 4, the side saddle portion further including a floor provided between the outer side saddle wall and the inner side saddle wall, the side saddle passage thereby defined by inner side saddle wall, the outer side saddle wall, and the floor,
   wherein the floor is offset from the top surface such that the top surface is provide at a top end of the adapter and the floor is provide at a bottom end of the adapter, the side saddle passage thereby open at the top end of the adapter and the mounting passage thereby open at the bottom end of the adapter.

6. The wiper blade adapter of claim 5 further comprising a plurality of reinforcing members including
   a vertical reinforcing member provided on an outer surface of the outer side saddle wall,
   a horizontal reinforcing member provided on the outer surface of the outer side saddle wall, the horizontal and vertical reinforcing members intersecting each other, and
   a transverse reinforcing member provided on an outer surface of the floor.

7. The wiper blade adapter of claim 4 further comprising a plurality of reinforcing members including
   a vertical reinforcing member provided on an outer surface of the outer side saddle wall,
   a horizontal reinforcing member provided on the outer surface of the outer side saddle wall, the horizontal and vertical reinforcing members intersecting each other, and
   a transverse reinforcing member provided on an outer surface of a floor of the side saddle portion.

8. The wiper blade adapter of claim 1, further comprising a plurality of reinforcing ribs provided within the interim gap and oriented substantially transverse to the interim gap.

9. A wiper blade adapter having opposed elongate ends, a top end and a bottom end spaced from and opposed to the top end, the adapter comprising:
   a side saddle portion including
      an elongate outer side saddle wall including an uppermost edge,
      an elongate inner side saddle wall opposed to the outer side saddle wall,
      a floor provided at the bottom end of the adapter between the outer side saddle wall and the inner side saddle wall, the inner and outer side saddle walls together with the floor thereby defining an elongate side saddle passage, and
      a side saddle rivet provided substantially within the side saddle passage, the side saddle rivet oriented substantially transverse to the side saddle passage, the side saddle rivet dimensioned to be securable within an arcuate rivet clip of a wiper blade connector; and
   a mounting portion including
      an elongate outer mounting wall, a top surface provided at the top end of the adapter, above the uppermost edge, and extending from the outer mounting wall and terminating at the inner side saddle wall, and an elongate inner mounting wall projecting from the top surface and oriented opposed to the outer mounting wall, the inner and outer mounting walls together with the top surface defining an elongate mounting passage, wherein the mounting passage and the side saddle passage are substantially parallel with one another.

10. The adapter of claim 9, further comprising an interim gap between the inner mounting wall and the inner side saddle wall, and the interim gap further defined by the top surface.

11. The adapter of claim 10 further comprising an interim wall projecting from the top surface into the interim gap, the interim wall substantially elongate and oriented substantially parallel to the interim gap, the interim wall provided along at least a majority of the length of the interim gap.

12. The adapter of claim 11 further comprising:
an arcuate rivet clip defined in each of the inner and outer mounting walls, the arcuate rivet clip pivotally connectable with a rivet provided on a wiper blade; and
a rivet end recess provided in the interim wall adjacent to the arcuate rivet clip.

13. The wiper blade adapter of claim 11 further comprising a plurality of reinforcing ribs provided within the interim gap and oriented substantially transverse to the interim gap.

14. The adapter of claim 9, wherein the mounting passage is open at the bottom end of the adapter and the side saddle passage is open at the top end of the adapter.

15. A wiper blade adapter having opposed elongate ends as well as a top end and a bottom end, the top end spaced from and opposed to the bottom end, the adapter comprising:
a side saddle portion including
an elongate outer side saddle wall,
an elongate inner side saddle wall opposed to the outer side saddle wall,
a floor provided at the bottom end of the adapter between the outer side saddle wall and the inner side saddle wall, the inner and outer side saddle walls together with the floor thereby defining an elongate side saddle passage, and
a side saddle rivet provided substantially within the side saddle passage, the side saddle rivet oriented substantially transverse to the side saddle passage, the side saddle rivet dimensioned to be securable within an arcuate rivet clip of a wiper blade connector;
a mounting portion including
an elongate outer mounting wall,
an elongate inner mounting wall opposed to the outer mounting wall,
a top surface provided at the top end of the adapter between the outer mounting wall and the inner mounting wall, the inner and outer mounting walls together with the top surface defining an elongate mounting passage,
wherein the mounting passage and the side saddle passage are substantially parallel with one another, and
wherein the mounting passage is open at the bottom end of the adapter and the side saddle passage is open at the top end of the adapter, and wherein an arcuate rivet clip is defined in each of the inner and outer mounting walls.

16. The adapter of claim 15, wherein the top surface extends between the outer mounting wall and terminates at the inner side saddle wall, and the inner mounting wall projects from the top surface.

17. The adapter of claim 15 wherein an interim gap exists between the inner mounting wall and the inner side saddle wall.

18. The adapter of claim 17, further comprising a plurality of reinforcing ribs provided within the interim gap and oriented substantially transverse to the interim gap.

19. The adapter of claim 17, further comprising an interim wall projecting from the top surface into the interim gap, the interim wall substantially elongate and oriented substantially parallel to the interim gap, the interim wall provided along at least a majority of the length of the interim gap.

20. The adapter of claim 19, further comprising:
an arcuate rivet clip defined in each of the inner and outer mounting walls, the arcuate rivet clip connectable with a rivet provided on a wiper blade; and
a rivet end recess provided in the interim wall adjacent to the arcuate rivet clip.

21. The adapter of claim 15, further comprising a plurality of reinforcing members including
a vertical reinforcing member provided on an outer surface of the outer side saddle wall,
a horizontal reinforcing member provided on the outer surface of the outer side saddle wall, the horizontal and vertical reinforcing members intersecting each other, and
a transverse reinforcing member provided on an outer surface of the floor.

22. A wiper blade assembly comprising:
a wiper blade including a mounting base with a mounting base rivet; and
an adapter comprising
a side saddle portion including
an outer side saddle wall and an inner side saddle wall together defining an elongate side saddle passage, and
a side saddle rivet provided substantially within the side saddle passage, the side saddle rivet oriented substantially transverse to the side saddle passage, the side saddle rivet dimensioned to be securable within an arcuate rivet clip of a wiper blade connector, and
a mounting portion including
an outer mounting wall and an inner mounting wall together defining an elongate mounting passage, the side saddle passage substantially parallel with the mounting passage, and
an arcuate rivet clip defined in each of the inner and outer mounting walls, the arcuate rivet clip connectable with the mounting base rivet of the wiper blade,
an interim gap between the inner mounting wall and the inner side saddle wall, the interim gap substantially parallel to the mounting passage and the side saddle passage,
an interim wall within the interim gap, the interim wall substantially elongate and oriented substantially parallel to the interim gap, the interim wall provided along at least the majority of the length of the interim gap, and
a rivet end recess provided in the interim wall adjacent to the arcuate rivet clip.

23. A wiper blade assembly comprising:
a wiper blade; and
a wiper blade adapter having opposed elongate ends, a top end and a bottom end spaced from and opposed to the top end, the adapter comprising
a side saddle portion including an elongate outer side saddle wall including an uppermost edge,
an elongate inner side saddle wall opposed to the outer side saddle wall,
a floor provided at the bottom end of the adapter between the outer side saddle wall and the inner side saddle wall, the inner and outer side saddle walls together with the floor thereby defining an elongate side saddle passage, and
a side saddle rivet provided substantially within the side saddle passage, the side saddle rivet oriented substantially transverse to the side saddle passage, the side saddle rivet dimensioned to be securable within an arcuate rivet clip of a wiper blade connector, and
a mounting portion including
an elongate outer mounting wall,
a top surface provided at the top end of the adapter, above the uppermost edge, and extending from the outer mounting wall and terminating at the inner side saddle wall, and
an elongate inner mounting wall projecting from the top surface and oriented opposed to the outer mounting wall, the inner and outer mounting walls together with the top surface defining an elongate mounting passage,
wherein the wiper blade is connectable with the mounting portion, and
wherein the mounting passage and the side saddle passage are substantially parallel with one another.

24. A wiper blade assembly comprising:
a wiper blade; and
a wiper blade adapter having opposed elongate ends as well as a top end and a bottom end, the top end spaced from and opposed to the bottom end, the adapter comprising
a side saddle portion including
an elongate outer side saddle wall,
an elongate inner side saddle wall opposed to the outer side saddle wall,
a floor provided at the bottom end of the adapter between the outer side saddle wall and the inner side saddle wall, the inner and outer side saddle walls together with the floor thereby defining an elongate side saddle passage, and
a side saddle rivet provided substantially within the side saddle passage, the side saddle rivet oriented substantially transverse to the side saddle passage, the side saddle rivet dimensioned to be securable within an arcuate rivet clip of a wiper blade connector, and
a mounting portion including
an elongate outer mounting wall,
an elongate inner mounting wall opposed to the outer mounting wall,
a top surface provided at the top end of the adapter between the outer mounting wall and the inner mounting wall, the inner and outer mounting walls together with the top surface defining an elongate mounting passage,
wherein the wiper blade is connectable with the mounting portion,
wherein the mounting passage and the side saddle passage are substantially parallel with one another, and
wherein the mounting passage is open at the bottom end of the adapter and the side saddle passage is open at the top end of the adapter, and wherein an arcuate rivet clip is defined in each of the inner and outer mounting walls.

* * * * *